US010140477B2

(12) United States Patent
Pandian et al.

(10) Patent No.: US 10,140,477 B2
(45) Date of Patent: Nov. 27, 2018

(54) OBFUSCATING IN MEMORY ENCRYPTION KEYS

(71) Applicant: Vormetric, Inc., San Jose, CA (US)

(72) Inventors: Ramaraj Pandian, San Jose, CA (US); Rohan Nandode, Sam Kpse, CA (US); Rajesh Gupta, San Jose, CA (US)

(73) Assignee: THALES E-SECURITY, INC., San Jose, CA (US)

( * ) Notice: Subject to any disclaimer, the term of this patent is extended or adjusted under 35 U.S.C. 154(b) by 0 days.

(21) Appl. No.: 14/101,074

(22) Filed: Dec. 9, 2013

(65) Prior Publication Data

US 2015/0161414 A1 Jun. 11, 2015

(51) Int. Cl.
| | | |
|---|---|---|
| G06F 11/30 | (2006.01) | |
| G06F 12/14 | (2006.01) | |
| G06F 21/70 | (2013.01) | |
| G06F 21/79 | (2013.01) | |
| H04L 9/08 | (2006.01) | |
| G09C 1/00 | (2006.01) | |

(52) U.S. Cl.
CPC ............. *G06F 21/79* (2013.01); *G09C 1/00* (2013.01); *H04L 9/0894* (2013.01); *G06F 2221/2143* (2013.01); *H04L 2209/04* (2013.01); *H04L 2209/12* (2013.01)

(58) Field of Classification Search
CPC ....................................................... G06F 21/70
USPC ......................................................... 713/189
See application file for complete search history.

(56) References Cited

U.S. PATENT DOCUMENTS

| | | | | |
|---|---|---|---|---|
| 5,870,468 | A * | 2/1999 | Harrison | ............. G06F 21/6209 713/165 |
| 8,090,100 | B2 | 1/2012 | Kito et al. | |
| 8,443,211 | B2 | 5/2013 | Zhao et al. | |
| 8,806,223 | B2 | 8/2014 | Crowe | |
| 8,949,508 | B2 | 2/2015 | Wakrat et al. | |
| 2002/0176575 | A1* | 11/2002 | Qawami | ................. G06F 21/10 380/201 |
| 2005/0125684 | A1* | 6/2005 | Schmidt | .................... H04L 9/30 726/27 |
| 2005/0129244 | A1* | 6/2005 | Catherman | ............. G06F 21/50 380/277 |
| 2006/0265375 | A1* | 11/2006 | Hess | .................... G06F 21/6209 |
| 2008/0126301 | A1* | 5/2008 | Bank | ..................... G06F 11/366 |

(Continued)

FOREIGN PATENT DOCUMENTS

WO WO 2013119401 8/2013

OTHER PUBLICATIONS

PC.net, "Definition of Hibernate", http://pc.net/glossary/definition/hibernate.*

(Continued)

*Primary Examiner* — Catherine B Thiaw
*Assistant Examiner* — Quy C Pham
(74) *Attorney, Agent, or Firm* — Womble Bond Dickinson (US) LLP

(57) ABSTRACT

A method for obfuscating keys is provided. The method includes identifying that a memory is subject to one of a core dump or an hibernation and overwriting a key in unencrypted form in the memory, responsive to the identifying, wherein at least one method operation is performed by a processor. A system and a computer readable media are also provided.

20 Claims, 4 Drawing Sheets

(56) References Cited

U.S. PATENT DOCUMENTS

| | | | | |
|---|---|---|---|---|
| 2009/0113214 A1* | 4/2009 | Dolgunov | ............. | G06F 21/556 |
| | | | | 713/189 |
| 2009/0172409 A1* | 7/2009 | Bullis | ................... | G06F 21/50 |
| | | | | 713/189 |
| 2009/0300424 A1* | 12/2009 | Kojima | ............... | G06F 11/0778 |
| | | | | 714/39 |
| 2013/0198521 A1* | 8/2013 | Wu | ................... | G06F 21/6209 |
| | | | | 713/175 |
| 2013/0212367 A1* | 8/2013 | Ingalls | ................... | G06F 21/88 |
| | | | | 713/2 |
| 2014/0229739 A1* | 8/2014 | Roth | ................... | G06F 21/6218 |
| | | | | 713/189 |
| 2015/0113240 A1* | 4/2015 | Abrams | ............. | G06F 12/1458 |
| | | | | 711/163 |
| 2015/0121086 A1* | 4/2015 | Smith | ................... | G06F 21/72 |
| | | | | 713/189 |

OTHER PUBLICATIONS

International Search Report, PCT/US2015/069358, dated Sep. 23, 2015.
NPL—Adam Skillen et al: "Deadbolt: locking down android disk encryption", Security and Privacy in Smartphones & Mobile Devices, [Online] Nov. 8, 2013, pp. 3-14.

* cited by examiner

OBFUSCATING IN MEMORY ENCRYPTION KEYS

BACKGROUND

Encryption processing, such as encrypting, decrypting and/or re-encrypting files involves use of keys, such as encryption or decryption keys. Encrypted files are considered secure, as long as hostiles are unable to obtain keys. During encryption processing, keys could be accessible and therefore vulnerable to hostile attacks. If hostiles can find keys, they can steal the keys and use the keys to decrypt files. Known methods and mechanisms for key handling leave windows of vulnerability, which hostiles can exploit. Therefore, there is a need in the art for a solution which overcomes the drawbacks described above.

SUMMARY

In some embodiments, a method for obfuscating keys is provided. The method includes identifying that a memory is subject to one of a core dump or a hibernation and overwriting a key in unencrypted form in the memory, responsive to the identifying, wherein at least one method operation is performed by a processor. A system and a computer readable media are also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Suppose one or more hostiles gains access to system memory during encryption processing, or storage memory containing an image of the system memory after a core dump or commencement of hibernation. In these scenarios, a key used for encryption processing could be read and stolen, then used for decrypting supposedly secure files. These and other vulnerabilities are addressed by embodiments of the agent, encryption processing system, and related method disclosed herein.

These embodiments have two aspects which can be used independently, i.e., one without the other, or in separate modules or processes, or these aspects can be used in combination. In a first aspect, shown in FIG. 1 and FIG. 4, the time window of vulnerability during encryption processing is minimized, by minimizing the amount of time that a key in plaintext or unencrypted form is present in memory. In a second aspect, shown in FIG. 2, FIG. 3 and FIG. 4, the memory is scrubbed by writing over the unencrypted key, so that a core dump or an hibernation results in storage of an image of the memory, with a pattern where the unencrypted key would have been. By practicing the first aspect, the second aspect, or both, vulnerability of a key, the system and the files, is decreased.

Figure 1:
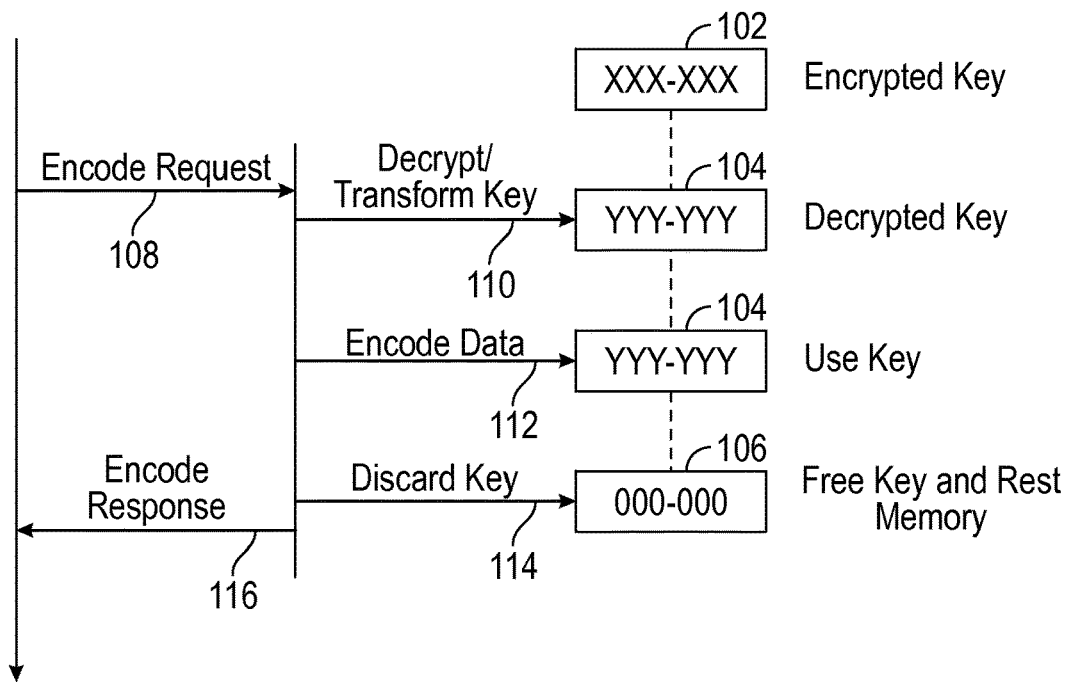
FIG. 1 shows a key obfuscation workflow, in which a key is decrypted for on-demand use in encryption processing, and then discarded after use in accordance with some embodiments.

FIG. 1 shows a key obfuscation workflow, in which a key is decrypted for on-demand use in encryption processing, and then discarded after use. This workflow is applicable to encryption processing, such as performed by a computing device in a physical computing environment or a virtual computing environment (which is supported by a physical computing environment). The term "key" is used herein in a general and collective sense, in that a key could be an encryption key, a decryption key, or both, or could include multiple keys, and is not limited to being a particular key or type of key. The key could be applied to encryption, or decryption, or both.

In the workflow of FIG. 1, an encode request 108 is made. In response to the encode request 108, an action to decrypt 110 is performed, in which an encrypted key 102 is decrypted to form a decrypted key 104. It should be appreciated that the decrypted key 104 is a key in unencrypted form, decrypted form, or plaintext form.

In variations, the encrypted key 102 could be a multiply encrypted key, such as a doubly encrypted key or a triply encrypted key and so on. Accordingly, the decrypt 110 action would be a double decryption or a triple decryption, etc. Other multi-level encryptions and decryptions could be applied. Other transformations, such as moving characters ahead by two, could be applied to an encrypted key or to a decrypted key.

After the decrypt 110, an action to encode data 112 is performed, in which the decrypted key 104 is used to encode data, for example to encode a file or a portion thereof. In response to completing the encode data 112, an action to discard the key 114 is performed, in which the key is freed and the memory is reset. The reset memory 106 is shown in this example as having all zeros, but other patterns could be written into the memory location that originally stored the decrypted key 104. After the discard key 114 action, an encode response 116 is generated or sent, announcing or confirming that the encode request 108 has been satisfied.

The discard key 114 action can be performed in various ways, in various embodiments. Of importance is that the discard key 114 action acts to obscure the decrypted key 104. In some embodiments, the decrypted key 104 is overwritten in the memory. For example, a pattern can be written into the location storing the decrypted key 104, so that the pattern overwrites the decrypted key 104. The pattern could be a predetermined pattern, or a random pattern. In some embodiments, the pattern indicates that there is no key at that location in memory, i.e., the key is a predetermined code, flag or indicator that can be recognized, detected or interpreted as having such a meaning. In some embodiments, the memory location storing the decrypted key 104 is deallocated, and some other action writes new data into that location, in place of the decrypted key 104. This could also be considered an action of overwriting.

The workflow of FIG. 1 minimizes the amount of time that the decrypted key 104 is vulnerable. The encrypted key 102 is only decrypted, to form the decrypted key 104, when the key is needed to satisfy an encode request 108. And, the decrypted key 104 is discarded as soon as the encryption operation, i.e. the encode data 112 action, is complete. As part of the discard key 114 action, the decrypted key 104 is overwritten in the memory, so that the decrypted key 104 is no longer present in the memory. This workflow is equally applicable to requests to encrypt, decrypt, encode or decode data, with the encode request 108, the encode data action 112, and the encode response 116 adjusted accordingly. With this workflow, a key in plaintext form, i.e., an unencrypted key, is not present in memory prior to usage or after usage of the key.

Figure 2:
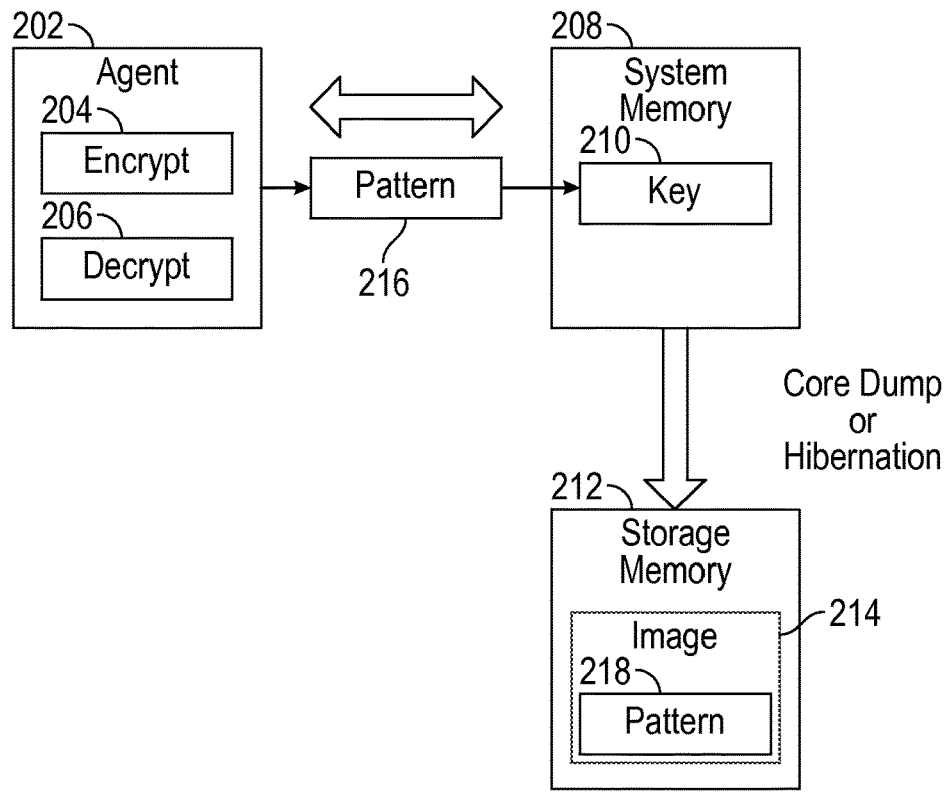
FIG. 2 is a schematic diagram of an agent interacting with system memory, obfuscating a key that otherwise would be vulnerable in a core dump or an hibernation in accordance with some embodiments.

FIG. 2 is a schematic diagram of an agent 202 interacting with system memory 208, obfuscating a key that otherwise would be vulnerable in a core dump or an hibernation. The agent 202 is equipped with an encrypt module 204, and a decrypt module 206, and applies these in encrypting and decrypting data, using an appropriate key. For example, the agent could be operable on a processor coupled to a memory. The memory could include random-access memory (RAM, e.g., dynamic RAM or DRAM). In the scenario depicted in FIG. 2, the agent 202 has written a key to a memory location 210 in the system memory, e.g., in RAM. This could be a decrypted key 104 from the key obfuscation workflow of FIG. 1, or an otherwise unencrypted key obtained in a different way. In this scenario, a core dump or an hibernation is about to occur, i.e., is imminent, or has begun but is not yet completed.

For example, an application or the system could have crashed, or an hostile attack could have caused a crash, and the operating system could be initiating a core dump. The core dump copies the system memory 208 to a storage memory 212, producing an image 214 of the system memory 208. The image 214 of the system memory 208 could be useful in debugging an application or investigating why an application or the system crashed, or tracing an hostile attack. As a further example, the system could be going into hibernation as a result of idle operations, lack of user input, a timeout, a power down or other initiating event. The operating system could be initiating a copy of the system memory 208 into the storage memory 212, producing an image 214 of the system memory 208. The image 214 of the system memory 208 would then be available for copy back into the system memory 208, to restore operation once hibernation is ended and the system awakes.

However, typical core dumps or hibernations would leave the key vulnerable, as a copy of the key would be available in the image 214 of the system memory 208, were it not for the following. The agent 202 detects, recognizes or otherwise identifies that a core dump or an hibernation is imminent or in progress, and, in response, writes a pattern to the memory location 210 in the system memory 208. This pattern overwrites the key. Then, when the system memory 208 is copied into the storage memory 212 to produce the image 214 of the system memory 208, the pattern is copied into the image 214 to produce a copy 218 of the pattern 216 in the image 214 of the system memory 208. This results in the storage memory 212 having a copy 218 of the pattern 216, but not a copy of the key. So, a core dump or an hibernation following the above-described process does not leave the key vulnerable, as there is no copy of the key in the image 214 of the system memory 208.

There are various ways the agent 202 could detect or recognize that a core dump or an hibernation is imminent or in progress. In one embodiment, the agent 202 intercepts an interrupt or a thread, or diverts a routine, destined to initiate the core dump or the hibernation, and performs the above-described actions before returning control to the core dump or the hibernation processes. In one embodiment, the operating system is modified and calls a subroutine, starts a process, initiates a thread, or otherwise hands control over to the agent 202 prior to or early on when performing the core dump or the hibernation. In one embodiment, the agent 202 polls the operating system or other processes. In one embodiment, the operating system or another process passes one or more parameters to the agent 202. Other mechanisms by which the agent 202 could detect or recognize that a core dump or an hibernation is imminent or in progress can be devised in accordance with the teachings disclosed herein.

Upon return from a crash, i.e., after a reboot, the agent 202 obtains a replacement key, since the key was overwritten in memory, by the agent 202 prior to or early on during the core dump. Alternatively, the agent 202 could test to see if the key has been overwritten, and if so, obtain a replacement key.

Similarly, upon return from hibernation, the agent 202 obtains a replacement key, since the key was overwritten in memory, by the agent 202 prior to or early on in the hibernation. Alternatively, the agent 202 could test to see if the key has been overwritten, and if so, obtain a replacement key.

One mechanism by which the agent 202 could determine if the key has been overwritten is to write a pattern into the location in memory where the key was being held. As with the discard key 114 action described with reference to FIG. 1, the pattern by which the key is overwritten could be all zeros, or a random pattern, or a predetermined code, flag or indicator that can be recognized, detected or interpreted as indicating there is no key at that location in memory.

In a further embodiment, the key is held in decrypted or unencrypted form in a register of a processor. In order to write a pattern over the decrypted or unencrypted key, i.e., to overwrite the key, the processor loads the pattern into the register. In such an embodiment, the unencrypted key is not held in the system memory.

Figure 3:
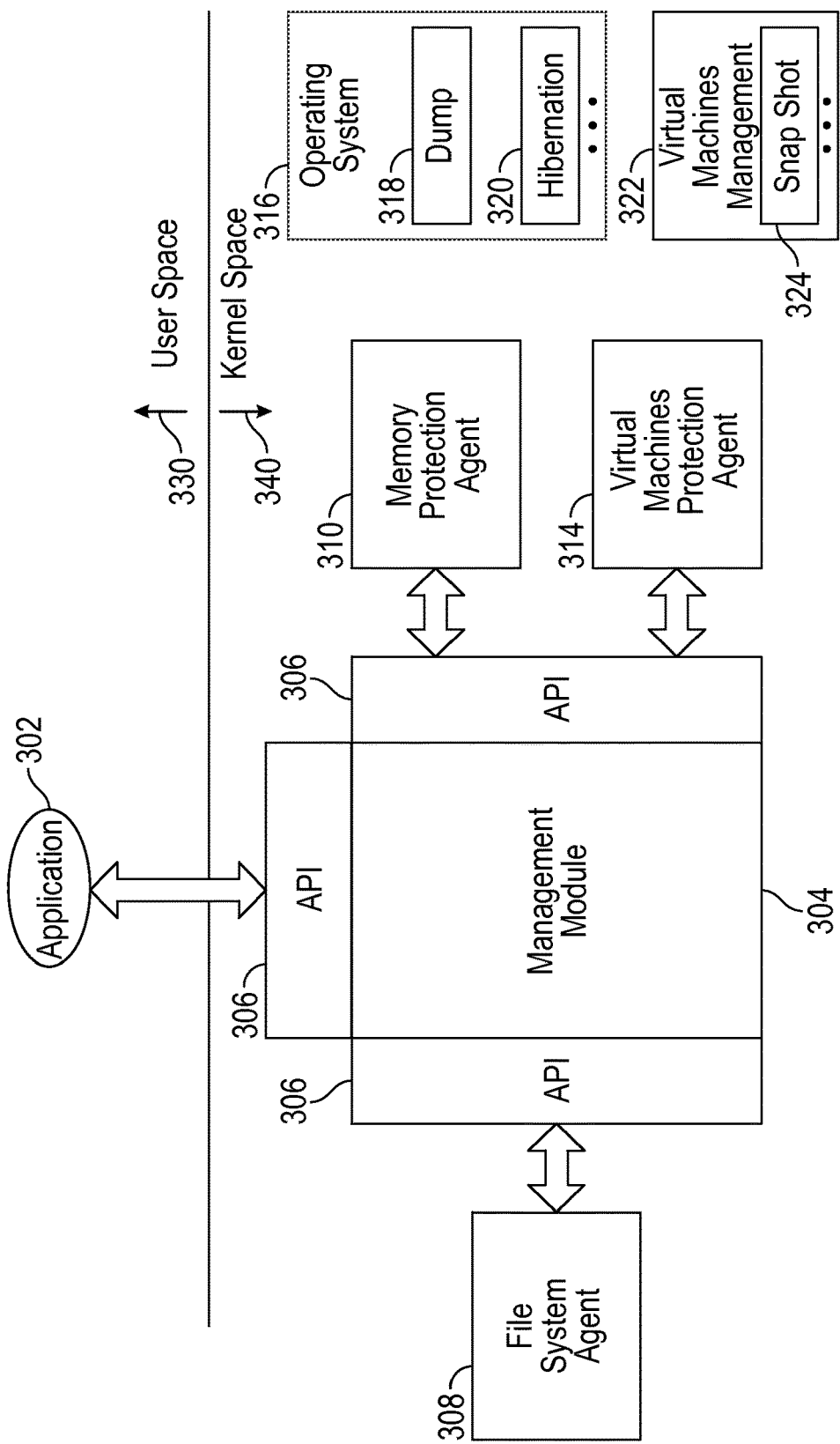
FIG. 3 is a schematic diagram of an encryption processing system, which uses an embodiment of the agent of FIG. 2 in accordance with some embodiments.

FIG. 3 is a schematic diagram of an encryption processing system, which uses an embodiment of the agent 202 of FIG. 2. A management module 304 has one or more application programming interfaces 306 (APIs), which support communication with other modules, applications and agents. In the scenario shown in FIG. 3, an application 302 in user space 330 is interacting with the management module 304, which is in kernel space 340. A file system agent 308 is interacting with the management module 304, via one of the application programming interfaces 306. For example, the application 302 could be operating on a file which is obtained by the filesystem agent 302, and the file could need encryption or decryption. A memory protection agent 310, and a virtual machines protection agent 314 are also interacting with the management module 304. In one embodiment, the memory protection agent 310 is an embodiment of the agent 202 of FIG. 2. In one embodiment, the virtual machines protection agent 314 is an embodiment of the agent 202 of FIG. 2. An operating system 316 provides the operating system environment for the kernel space 340, and has a dump module 318 and an hibernation module 320 which can be used in the event of a crash or sleep, respectively. The virtual machines management module 322 manages the virtual computing environment, as supported by a physical computing environment. The virtual machines management module has a snapshot module 324, which can be used to form images of the memories of virtual machines, in a manner similar to a dump or an hibernation.

The memory protection agent 310 has a hook into the operating system 316, so that the memory protection agent 310 can detect or recognize when a dump or an hibernation is imminent or in progress. Under such conditions, the memory protection agent 310 performs some or all of the actions described of the agent 202 with reference to FIG. 2, and/or some or all of the actions described in the key obfuscation workflow of FIG. 1. The memory protection agent 310 thus protects physical memory from vulnerability as to unencrypted keys.

Similarly, the virtual machines protection agent 314 has a hook into the virtual machines management module 322, so that the virtual machines protection agent 314 can detect or recognize when a snapshot is imminent or in progress. Under such conditions, the virtual machines protection agent 314 performs some or all of the actions described of the agent 202 with reference to FIG. 2, and/or some or all of the actions described in the key obfuscation workflow of FIG. 1. The virtual machines protection agent 314 thus protects virtual memory from vulnerability as to unencrypted keys.

In variations of the encryption processing system of FIG. 3, one embodiment of an encryption processing system has the memory protection agent 310 but not the virtual machines protection agent 314, and exists entirely in a physical computing environment. One embodiment of an encryption processing system is the virtual machines protection agent 314 but not the memory protection agent 310, and operates in a virtual computing environment as supported by a physical computing environment. One embodiment of an encryption processing system integrates the memory protection agent 310 and the virtual machines protection agent 314, providing protection of both physical memory and virtual memory from vulnerability as to unencrypted keys.

Some embodiments perform the key decryption and discarding actions of FIG. 1 without the key overwriting actions of FIG. 2. Some embodiments perform the key overwriting actions of FIG. 2 without the key decryption and discarding actions of FIG. 1. Some embodiments perform the key discarding actions of FIG. 1 with the key overwriting actions of FIG. 2. Some embodiments perform the key decryption and discarding actions of FIG. 1 with the key overwriting actions of FIG. 2.

Figure 4:
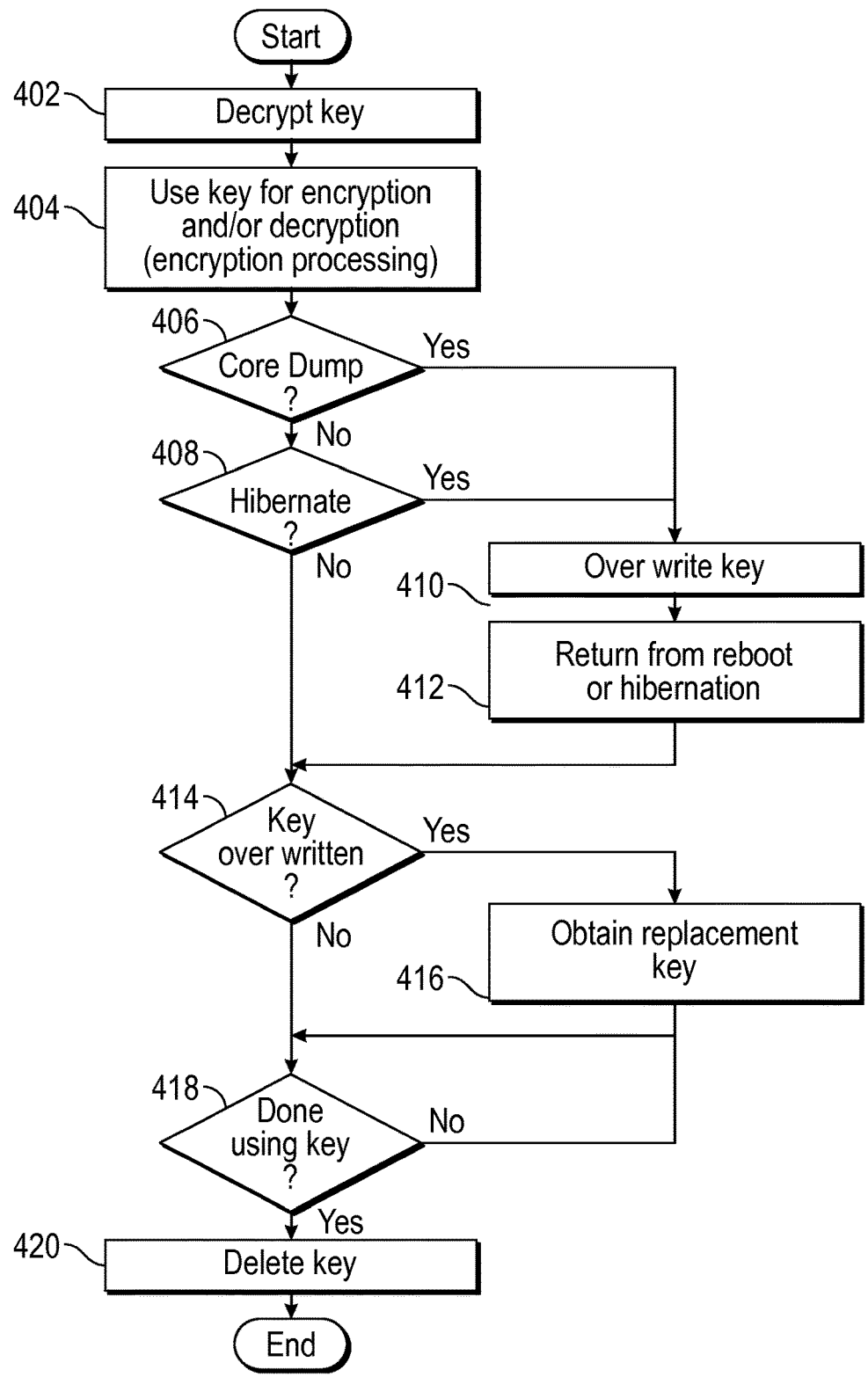
FIG. 4 is a flow diagram of a method for obfuscating keys, which includes a variation of the key obfuscation workflow of FIG. 1 and can be practiced using the agent of FIG. 2 or the encryption processing system of FIG. 3 in accordance with some embodiments.

FIG. 4 is a flow diagram of a method for obfuscating keys, which includes a variation of the key obfuscation workflow of FIG. 1 and can be practiced using the agent 202 of FIG. 2 or the encryption processing system of FIG. 3. The flow could start, from a start point, in response to a request for, or other initiation of, encryption processing.

A key is decrypted, in an action 402. For example, the encrypted key of FIG. 1, or a multi-level encrypted key could be decrypted, to form an unencrypted or plaintext key. The key is used for encryption and/or decryption, i.e., encryption processing, in an action 404.

In a decision action 406, the question is asked, is there a core dump? The question could be asked, and the answer determined, in various ways as discussed regarding FIGS. 2 and 3. If the answer is no, there is no core dump, the flow branches to the decision action 408. If the answer is yes, there is a core dump, the flow branches to the action 410.

In the decision action 408, the question is asked, is there an hibernation? The question could be asked, and the answer determined, in various ways as discussed regarding FIGS. 2 and 3. If the answer is no, there is no hibernation, the flow branches to the decision action 414. If the answer is yes, there is an hibernation, the flow branches to the action 410.

In the action 410, the key is overwritten. This action could be performed by writing a pattern to the memory location originally holding the key, as described regarding FIGS. 1 and 2. There is a return from a reboot or from hibernation, in the action 412. Flow returns to the decision action 414.

In the decision action 414, the question is asked, is the key overwritten? The question could be asked, and the answer determined, in various ways as discussed regarding FIG. 2. For example, the operating system could set a parameter indicating there had been a crash and reboot, or an hibernation and an awakening. Or, the value of data or pattern used to overwrite the key could be used as a flag or indicator that the key has been overwritten. If the answer is no, the key has not been overwritten, the flow branches to the decision action 418. If the answer is yes, the key has been overwritten, the flow branches to the action 416.

In the action 416, a replacement key is obtained. This could be performed by obtaining a replacement encrypted key, then decrypting the key. The replacement key could be obtained from a user, an application, the operating system, an agent, or other source. Flow proceeds to the decision action 418.

In the decision action 418, the question is asked, is the encryption processing done using the key? If the answer is no, this key is still being used, the flow branches back to the decision action 418, and the encryption processing continues with the use of this key. If the answer is yes, the key is done being used, the flow branches to the action 420, in which the key is deleted. The key could be deleted using various mechanisms, as discussed regarding FIGS. 1 and 2.

In variations of the flow depicted in FIG. 4, positive answers to the decision action 406 and 408 could branch to separate routines for overwriting the key, rather than wrenching to a combined routine. A return from reboot or hibernation, as the action 412, could automatically assume that the key has been overwritten and flow instead to the action 416 to obtain a replacement key. The decision action 414, asking whether the key has been overwritten, could be performed elsewhere in the flow, or could be performed repeatedly, or could be bypassed in the event of no core dump or no hibernation. The actions 404, 418, 424 relating to key use and deletion could be separated from the actions 406, 408, 410, 412, 414, 416 for core dump and hibernation, and run separately or in parallel.

Figure 5:
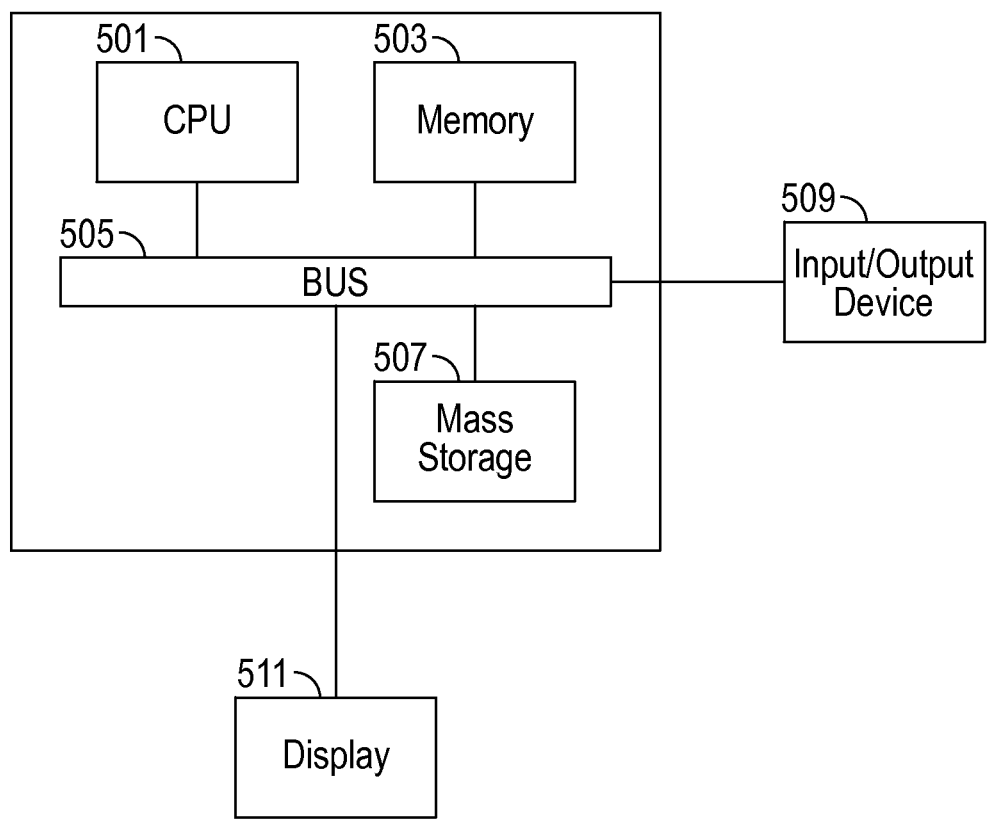
FIG. 5 is an illustration showing an exemplary computing device which may implement the embodiments described herein in accordance with some embodiments.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for encryption processing, key handling and memory protection in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for obfuscating keys, performed by a processor, the method comprising:
   using a key to perform encryption processing, wherein the key is in unencrypted form;
   identifying that a system memory is subject to a core dump, wherein the core dump comprises copying the system memory into storage memory to produce an image of the system memory;

overwriting, by an agent located in kernel space, the key in unencrypted form at a location in the system memory prior to the copying the system memory into the storage memory, responsive to the identifying, wherein the key is overwritten with a pattern;

executing the core dump, wherein the pattern is copied into the image to produce a copy of the pattern in the image of the system memory;

copying the image of the system memory back into the system memory;

determining, based on detecting the pattern at the location in the system memory, the key in unencrypted form was overwritten in the system memory;

obtaining a replacement key, responsive to the determining; and deleting the replacement key in response to determining that the encryption processing is complete.

2. The method of claim 1, wherein overwriting the key in the system memory includes writing one of a predetermined pattern, or a random pattern.

3. The method of claim 1, wherein the obtaining the replacement key further comprises:
obtaining the replacement key in response to rebooting.

4. The method of claim 1, wherein overwriting the key in the system memory includes writing data to the system memory that indicates the key is no longer in the system memory.

5. The method of claim 1, further comprising:
decrypting an encrypted key, to produce the key in unencrypted form.

6. The method of claim 1, further comprising:
doubly decrypting a doubly encrypted key, to produce the key in unencrypted form.

7. The method of claim 1, wherein the identifying includes one from a set consisting of:
calling a subroutine in response to initiation of the core dump;
using a hook to an operating system;
initiating a thread in response to initiation of the core dump; and
passing a parameter in response to initiation of the core dump.

8. The method of claim 1, wherein the pattern is a predetermined code, flag or indicator.

9. An encryption processing system, comprising:
a system memory; and
at least one agent, operable through a processor coupled to the system memory and located in a kernel space of the encryption processing system, the at least one agent configured to:
encrypt and decrypt files or portions thereof;
hold an unencrypted key at a location in the system memory, for encrypting and decrypting files;
detect, via a hook to an operating system, initiation of a core dump, wherein the core dump comprises copying the system memory into storage memory to produce an image of the system memory;
overwrite, with a pattern, the unencrypted key at the location in the system memory prior to the copying the system memory into the storage memory, responsive to defecting the initiation of the core dump;
executing the core dump, wherein the pattern is copied into the image to produce a copy of the pattern in the image of the system memory;

copying the image of the system memory back into the system memory;
detect the pattern at the location in the system memory, as indicating there is no key at the location in the system memory;
obtain a replacement key, responsive to the detecting the pattern; and
delete the replacement key in response to determining that an encryption processing is complete.

10. The encryption processing system of claim 9, wherein the unencrypted key in the system memory is overwritten in response to at least one from a set consisting of: a core dump that is about to occur, and a core dump that is begun but not yet completed.

11. The encryption processing system of claim 9, wherein:
the system memory includes random-access memory (RAM);
the at least one agent is configured to produce the unencrypted key as a result of a decryption of an encrypted key; and
the at least one agent is configured to write the unencrypted key into the RAM, to hold the unencrypted key in the system memory.

12. The encryption processing system of claim 9, wherein:
the image of the system memory is stored in the storage memory during the core dump; and
the image of the system memory includes data with which the unencrypted key was overwritten.

13. The encryption processing system of claim 9, wherein the at least one agent is further configured to decrypt a multi-level encrypted key to produce the unencrypted key.

14. The encryption processing system of claim 9, wherein the at least one agent is further configured to produce the unencrypted key from an encrypted key, in response to commencement of the encryption processing, the unencrypted key held in the system memory during at least a portion of the encryption processing.

15. The encryption processing system of claim 9, wherein the pattern is a predetermined, code, flag or indicator that is detectable to indicate there is no key at the location in the system memory.

16. A tangible, non-transient, computer-readable media having instructions thereupon which, when executed by a processor, cause an agent located in kernel space to perform a method comprising:
decrypting an encrypted key to produce a decrypted key;
applying the decrypted key to encryption processing;
detecting, via a hook to an operating system, that a core dump is initiated;
writing a pattern over the decrypted key in a location in a system memory, in response to detecting the core dump is initiated, wherein the writing the pattern is prior to copying the system memory into storage memory to produce an image of the system memory for the core dump;
executing the core dump, wherein the pattern is copied into the image to produce a copy of the pattern in the image of the system memory;
copying the image of the system memory back into the system memory;
recognizing the pattern at the location in the system memory as indicating there is no key at the location in the system memory;
obtaining a replacement key, responsive to the recognizing; and deleting the replacement key in response to determining that the encryption processing is complete.

17. The tangible, non-transient, computer-readable media of claim 16, wherein the decrypted key includes an encryption key, and the encryption processing includes encryption using the encryption key.

18. The tangible, non-transient, computer-readable media of claim 16, wherein the decrypted key includes a decryption key, and the encryption processing includes decryption using the decryption key.

19. The tangible, non-transient, computer-readable media of claim 16, wherein the method further comprises:
transforming the decrypted key.

20. The tangible, non-transient, computer-readable media of claim 16, wherein the pattern is a predetermined code, flag or indicator that is interpretable to indicate there is no key at the location in the system memory.

* * * * *

UNITED STATES PATENT AND TRADEMARK OFFICE
CERTIFICATE OF CORRECTION

PATENT NO. : 10,140,477 B2
APPLICATION NO. : 14/101074
DATED : November 27, 2018
INVENTOR(S) : Ramaraj Pandian, Rohan Nandode and Rajesh Gupta It is certified that error appears in the above-identified patent and that said Letters Patent is hereby corrected as shown below:

On the Title Page

Applicant:
Please correct, "Vormetric, Inc., San Jose, CA (US)" To --THALES E-SECURITY, INC., Plantation, FL (US)--

Signed and Sealed this
Sixth Day of August, 2019

Andrei Iancu
*Director of the United States Patent and Trademark Office*

Page 1 of 1